Figure 2:
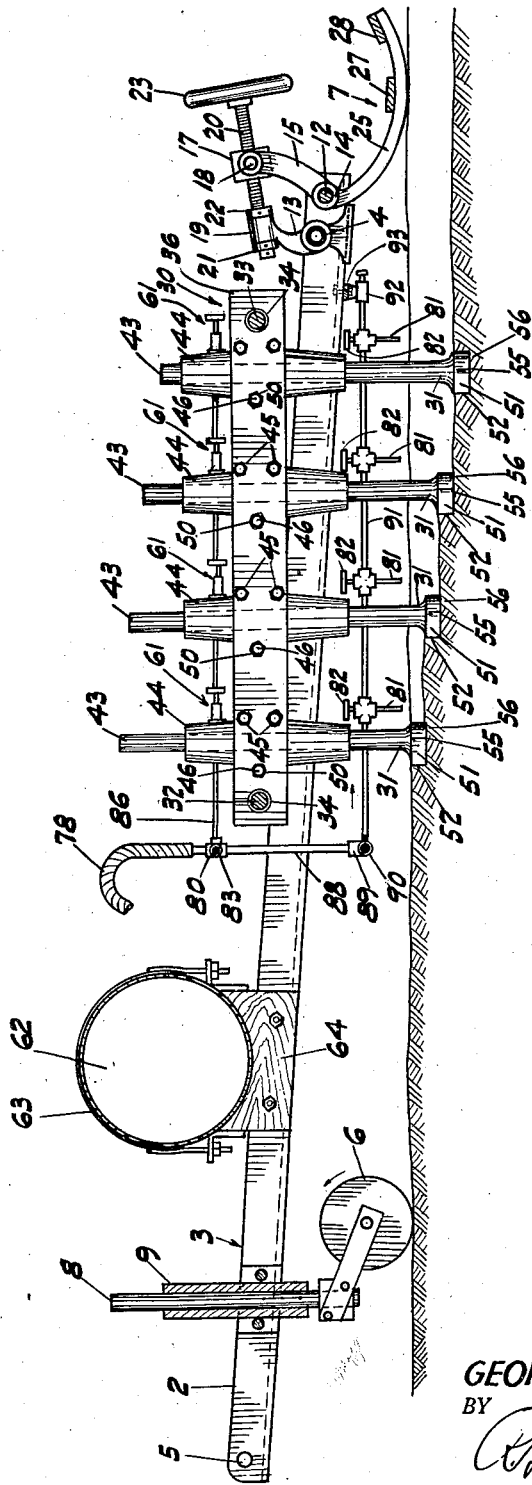

July 23, 1935. G. H. WOODS 2,008,891
SOIL RENOVATOR
Filed Feb. 15, 1934 3 Sheets-Sheet 1
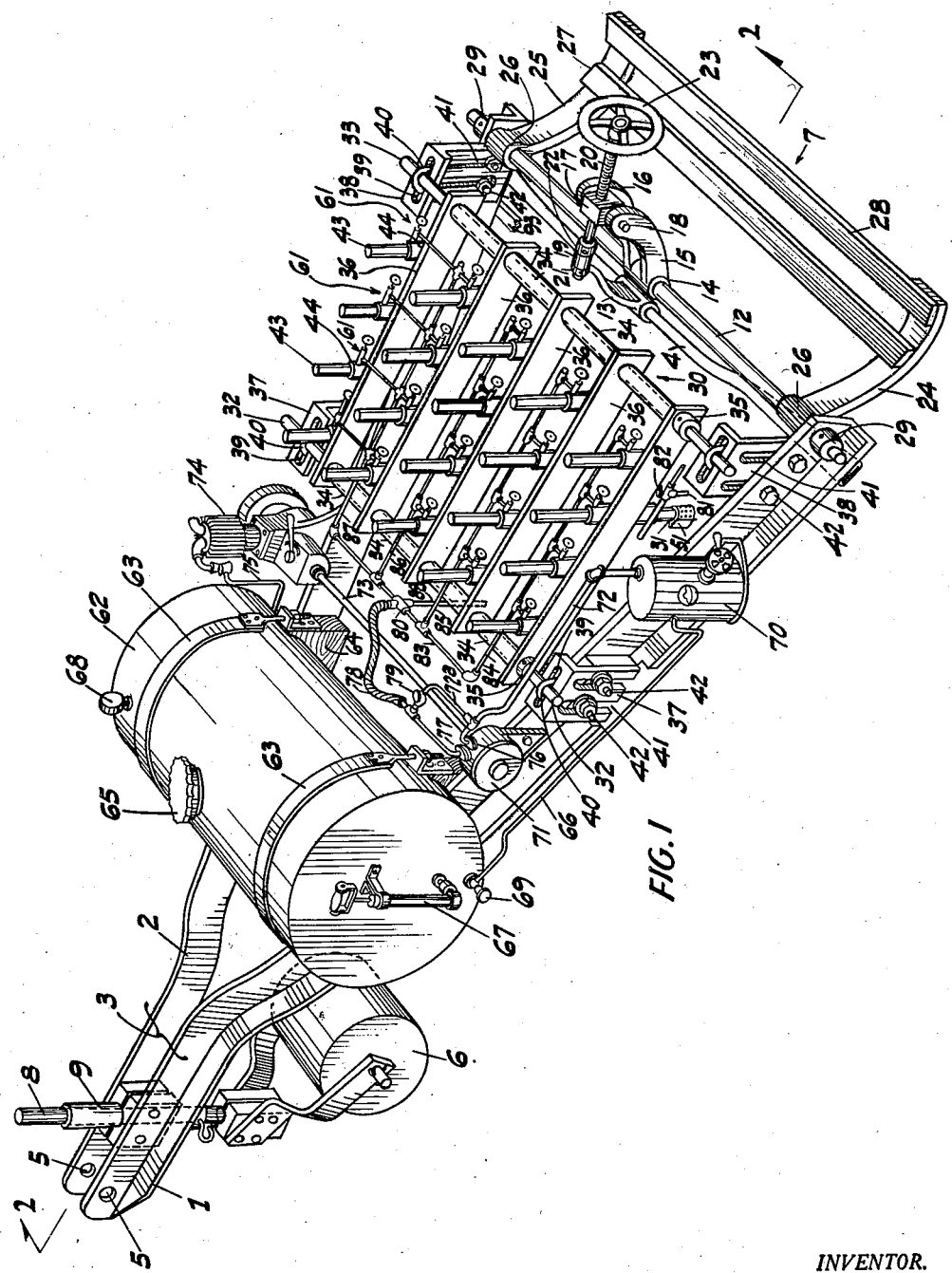
FIG.1
INVENTOR.
GEORGE H. WOODS
BY
ATTORNEY

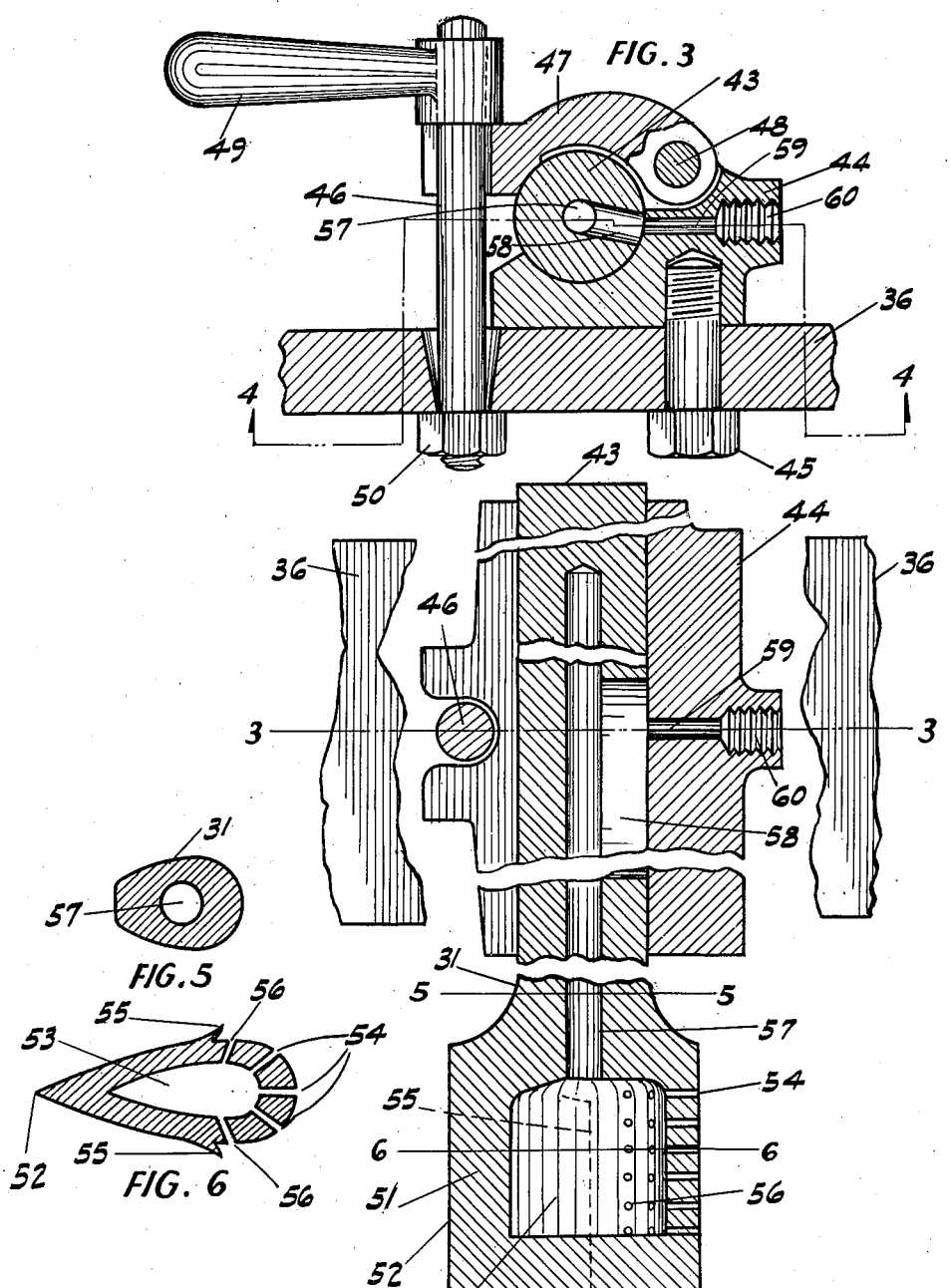

Patented July 23, 1935

2,008,891

UNITED STATES PATENT OFFICE 2,008,891

SOIL RENOVATOR

George H. Woods, San Diego, Calif.

Application February 15, 1934, Serial No. 711,334

22 Claims. (Cl. 111—7)

This invention relates to an agricultural implement. More specifically the invention has to do with an improvement in soil renovators wherein a flame or blast is ejected rearwardly of the soil treating tool as it is drawn thru the soil and caused, from the force of the blast, to penetrate into the loosened soil.

Important objects of the invention are to utilize a device of the above character in orchards for aiding in; (1), the extermination of pests such as red spiders, ants, gophers, foul vegetation and deleterious growths; (2), the extermination in gardens of pernicious insects such as cut worms, nematodes, snails and deleterious growths; (3), the extermination in grain fields of wild radish, mustard seed, other foul seeds, cut worms, bore worms and disease germs; and (4), the extermination in cotton fields of boll weevil.

A further object of the invention is to utilize the heat of combustion to warm the soil whereby to promote a more rapid growth of vegetation. Especially has this proved to be of merit in raising the temperature of soils where garden vegetables are being grown.

Yet another object is to provide an implement which may be drawn over the ground behind a sub-soiler and wherein the soil treating tools which are caused to penetrate the soil in addition to pulverizing it, produce an opening wherein the larvæ of insects which lie immediately below the earth's crust, are caused to be disturbed and destroyed in a superior manner, and which it would be impossible to accomplish otherwise.

Other objects, including providing an article of manufacture in the soil treating tool, per se, will hereinafter appear when the following description is read in the light of the drawings wherein—

Fig. 1 is a perspective view of the soil renovator; Fig. 2 is a section on line 2—2 of Fig. 1; Fig. 3 is a section on line 3—3 of Fig. 4; Fig. 4 is a fragmentary vertical mid-section thru one of the soil treating tools; Fig. 5 is a section on line 5—5 of Fig. 4; and Fig. 6 is a section on line 6—6 of Fig. 4.

Referring in detail to the drawings 1 and 2 represent side frame carrying members which at the forward or draft end of the device are brought into close proximity for a short distance to form a tongue like beam 3. Rearwardly of their front portions these carrying members diverge to such an extent as to have the appearance, approximately, of a huge expanded Y. Said carrying members are preferably constructed of angle iron beams whose flanges extend upwardly and outwardly from the vertices which are arranged adjacent each other.

The bottom flanges of the members 1 and 2 at their rear ends are joined together by means of a bent pipe 4. The ends of said pipes are flattened and welded to the under side of the horizontal flanges of the angle irons. In the vertical flanges of the angle beams, at their forward ends, are drilled holes 5 in which to fasten a draft-iron whereby the device may be attached to a tractor or draft vehicle for propulsion.

The front end of the frame just described is supported by means of a swivelling roller 6 and the rear end is supported by means of a drag element 7. The roller 6 is adjustably mounted, for swivel movement, upon the angle beams aforesaid by means of a shaft 8 journalled in the sleeve 9, said sleeve being supported between and fastened to the vertical flanges of the angle iron beams.

The drag element 7 is fixedly mounted upon the shaft 12. Said shaft is mounted in the vertical flanges of the angle iron beams at a point slightly in the rear of the pipe 4.

To the pipe 4 is fastened a bracket 13, and to the shaft 12 is fastened a bracket 14. The bracket 14 is provided with a pair of arms 15 and 16 between which is mounted a threaded bearing block 17 by means of the shaft 18. Owing to the previously described positioning of pipe 4 and shaft 12 these brackets are brought into proper relative positions.

The bracket 13 is provided with a bearing 19 thru which is extended one end of the shaft 20, and on that end on either side of the bearing 19 are mounted collars 21 and 22 for maintaining the shaft 20 in fixed relation thereto. The other end of the shaft 20 is threaded and screwed thru the block 17 and on the terminal portion of the threaded end is mounted a wheel 23 for manually operating the shaft 20 to rotationally adjust the shaft 12 and thereby vary the inclination of the drag element with relation to the device as a whole.

The drag element 7 comprises end arms 24 and 25 which are fixed to the rock shaft 12 just inside the vertical flanges of the angle members 1 and 2. Said arms are bowed downwardly and are connected to each other by means of the transverse bars 27 and 28. As said bars contact with the cultivated soil they serve to even the surface thereof in a manner that is well known.

The shaft 12 extends thru the vertical flanges of the angle beams to accommodate the mounting thereon of the collars 29, and the latter collars together with the bearings 26 of the end arms cooperate to strengthen the vertical flanges of the angle beams where they terminate at the rear.

On the side frame-carrying members I mount the carriage 30 to which all of the soil treating tools 31 are fastened. This carriage comprises a front shaft 32 and a rear shaft 33 and on said shafts between the spacers 34 and the collars 35 I mount the bars 36. Upon the latter bars are mounted the soil treating tools 31 most clearly shown in Figs. 3 and 4.

The ends of the shaft 32 are fastened to the L-shaped brackets 37 and the ends of the shaft 33 are fastened to the L-shaped brackets 38. Said brackets 37 and 38 are of somewhat similar construction and each of them is provided with a slot 39 in its horizontal leg. Thru said slots extend the U bolts 40 whereby the shafts are fastened to the brackets. Said brackets 37 and 38 are also provided with the vertically extending slots 41 in which may be moved the bolts 42 whereby said brackets are adjustably secured to the vertical legs of the angle beams.

The soil treating tools 31 have their shanks or stems 43 slidably mounted in the bearings 44 which are fastened to the bars 36 by means of the machine bolts 45 and the clamp bolts 46. The bearings 44 are provided with caps 47, see Fig. 3, said caps being swingable about the pin 48 as an axis when the handle 49 is operated to partially unscrew the bolt 46 from the nut 50.

The tools 31 are provided with parts 51 which penetrate the soil, said parts each having a wedge shape portion with convex sides and an edge portion 52 which performs a cutting action. The part 51 is provided with a combustion chamber 53 and there are a plurality of apertures or flame vents 54 extending from said chamber thru the tool rearwardly of its wedge shaped portion whereby a gas, flame or blast under pressure may be ejected into the surrounding earth as the tool is drawn therethru. These vents are directed more or less rearwardly in the part so as not to become clogged. Vanes 55 may be added, if desired, to protect the egress of the flame thru the side apertures 56.

The shank 43 is provided with a vertically extending bore 57 which communicates with the chamber 53 and a vertically extending slot 58 which communicates with the bore 57. There is also an intake 59 extending thru the wall of the bearing 44, which registers with the slot 58 whatever the position to which the tool may be adjusted in its bearing. The intake 59 is threaded partway, as indicated by the numeral 60, to accommodate the screwing thereunto of the valve assembly 61, said assembly being illustrated in Figs. 1 and 2.

A battery of five rows of soil treating tools is shown, and each row consisting of four tools. In Fig. 2 the tools are arranged in a stepped formation, in which the steps deepen from front to rear. This arrangement insures a thorough treatment of the soil, to such an extent at least as to exterminate or free it of pests and extraneous matter.

A fuel tank 62 of relatively large proportions is mounted transversely upon the angle iron beams 1 and 2 and is suitably held in position by straps 63 which are connected in any suitable manner to wooden bolsters 64 fastened to the vertical legs of the side frame-carrying members.

The fuel tank 62 is provided with a filler cap 65 and a fuel supply pipe 66. It is desirable to equip said tank with a hand operated pump 67 and a gage 68 to register the pressure in said tank. The fuel in the tank is forced thru the fuel valve 69 into the fuel pipe 66 whence it is conducted into the gas tank 70 where it is transformed into a gas. The gas tank 70 may be of any selected type of gas producer as, for example, it may operate on the order of the Coleman stove. Since no claim is laid to the gas producer per se, any type desired may be selected.

In order to supply the fuel from the tank 70 to the soil treating tools 31 I provide a gas pump 71 attached to the vertical flange of the angle iron 1 just rearwardly of the tank 62, and I connect said pump 71 to the tank 70 by means of the supply pipe 72. The pump 71 is operated by means of the shaft 73 connected to the motor 74. The motor is fastened to the vertical leg of the angle iron 2 opposite the pump 71, said motor receiving its fuel from the tank 62 thru the supply line 75.

The gas from the tank 70 flows thru the pipe 72 into the pump 71, thence thru the intake port 76 and out thru the discharge port 77 into the flexible hose 78 for distribution. Leading from the pipe 72 is a by-pass line 72a which also discharges into the flexible hose for supplying gas to the pilots 81. In said line is installed a by-pass valve 79. The flexible hose 78 is connected to a pipe fitting 80 thru which the gas is distributed both to the soil treating tools 31 and to the pilots 81. One of the pilots 81 with its regulating valve 82 is shown in Fig. 1, and a row of them is also shown in Fig. 2.

Screwed into the fitting 80 is a supply line 83, from which lead four branches 84, 85, 86 and 87 for supplying gas to the several rows of soil treating tools by means of the regulating valves referred to in a general sense by the numeral 61. Screwed also into said fitting 80 is the gas supply distributing pipe 88 thru which gas flows to the pilots 81. To the pipe 88 is also secured a fitting 89, and into said fitting is screwed a supply line 90, similar to the line 83. From said supply 90 also lead four pipe branches which are arranged similar to the four branches 84, 85, 86 and 87, but are placed far enough beneath so that when the regulating valves 82 are screwed thereonto, the pilots 81 leading from said valves will be in close proximity to the part 51 in order that the gas flowing from the parts 51 will be ignited by the several pilots. One example of a juxtaposed pilot is shown in Fig. 1.

In Fig. 2 I also show one complete branch line indicated by the numeral 91. Said line is fastened by means of the bracket 92 to the plate 93 which runs from side to side of the frame and is connected upon the horizontal flanges of the side carrying members. The plate 93 is fragmentarily shown in Fig. 1 and the connections described in relation to the branch line 91 equally applies for the remaining three branches.

The operation of the device is believed to be obvious in view of the above description.

I claim:

1. A soil penetrating and treating tool provided with a plurality of flame apertures in the portion of the tool which penetrates the ground.

2. A soil penetrating implement provided with a series of rearwardly directed apertures, and means for ejecting a flame thru said apertures into the soil cultivated by said implement.

3. A soil treating tool having a blast chamber, and a series of apertures leading therefrom, and means to direct a flame thru said apertures as said tool is drawn thru the soil.

4. A soil penetrating tool having a cutting edge for dividing the soil, and means to direct a hot blast from said tool in a direction opposite to said cutting edge during the dividing performance of said tool.

5. In a soil renovator implement, a frame, a plurality of soil treating tools having flame apertures in the penetrating portion mounted on said frame, and means carried by said frame for ejecting a hot blast from said tools thru said apertures while they perform a cultivating action upon the soil as they are drawn therethru.

6. In a soil renovator implement, a frame, a soil treating tool having flame apertures normally below the ground adjustably mounted on said frame, and means carried by said frame for ejecting a flame under pressure to the soil from said tool as it is caused to penetrate the soil.

7. In a soil renovator, a frame, and a soil penetrating tool mounted on said frame, there being a combustion chamber in said tool and holes leading from said combustion chamber to points beneath the surface of the soil during the operation of said tool.

8. A soil renovator, comprising a frame, a reservoir for fluid fuel mounted on said frame, a plurality of soil treating tools having flame apertures in that portion of the tool which normally lies beneath the surface of the ground carried by said frame adapted for expelling a flame from said tools as said tools cultivate the soil, and conduit means for supplying fuel from said tank to said tools.

9. A soil renovator, comprising a frame, a reservoir for fluid fuel mounted on said frame, a plurality of soil treating tools having chambers with flame apertures carried by said frame adapted for expelling a flame from said tools as said tools cultivate the soil, and valve controlled conduit means for supplying fuel from said tank to said tools.

10. A soil renovator, comprising a frame, a reservoir for fluid fuel mounted on said frame, a plurality of soil treating tools carried by said frame and having chambers with apertures leading therefrom adapted for expelling a flame as said tools cultivate the soil, and conduit means for supplying fuel under pressure from said tank to said tools.

11. An agricultural implement, comprising a frame adapted to have traction applied thereto, a plurality of soil treating tools having chambers with apertures leading therefrom mounted on said frame, means carried by said frame for supplying a gas to the chamber of said tools and thence thru said apertures to the soil as said tools perform a cultivating action to the soil thru which they are drawn, and a drag element for supporting the rear end of said frame.

12. A soil treating implement having, in combination, a tool having a combustion chamber for loosening the soil, traction means to move said tool thru the soil, and means to direct burning fuel from said combustion chamber into the soil as it is loosened by said tool.

13. As an article of manufacture a soil treating tool comprising a part having a cutting edge, a combustion chamber contained in said part and having apertures extending from said chamber to the outside of said part, and a shank provided with a bore leading into said chamber, there being an inlet communicating with said bore.

14. As an article of manufacture a soil treating tool comprising a part having a wedge shaped portion with convex sides, a combustion chamber being contained in said tool, there being apertures extending from said chamber thru the tool rearwardly of the wedge-shaped portion thereof, and a shank provided with a bore leading into said chamber, there being an inlet communicating with said bore.

15. A soil penetrating and treating tool provided with a chamber and having a plurality of apertures leading rearwardly therefrom for ejecting a flame therethru.

16. A soil renovator comprising a frame, a reservoir for fluid fuel mounted on said frame, a plurality of soil treating tools carried by said frame and having chambers provided with apertures for expelling a flame from said tools as they are drawn thru the soil, and conduit means for supplying fuel from said reservoir to said tools.

17. A soil renovator, comprising a frame, a reservoir for fluid fuel mounted on said frame, a plurality of soil treating tools carried by said frame and having chambers with apertures leading therefrom for expelling a flame from said tools as said tools cultivate the soil, and valve controlled conduit means for supplying fuel from said reservoir to said tools.

18. A soil renovator, comprising a frame, a reservoir for fluid fuel mounted on said frame, a plurality of soil treating tools carried by said frame and having chambers with apertures leading therefrom for expelling a flame as said tools cultivate the soil, and conduit means for supplying fuel under pressure from said reservoir to said tools.

19. A soil treating tool comprising a part having a cutting edge for dividing the soil, there being a chamber in said part and openings leading therefrom, and vanes on said part in advance of said openings.

20. A soil treating tool comprising a part having a cutting edge for dividing the soil, there being a chamber in said part and openings leading therefrom, vanes on said part in advance of said openings, and means to direct an ignitable gas thru said openings into the soil rearwardly of said vanes.

21. A sub-soiler tool having a wedge shaped portion with convex sides and vanes disposed along said sides.

22. A sub-soiler tool having a wedge shaped portion with convex sides, there being a chamber in said tool and apertures leading therefrom, and means to direct a gas under pressure into said chamber and thence thru said apertures into the soil thru which said tool is drawn.

GEORGE H. WOODS.